United States Patent
Pigeon

(10) Patent No.: US 9,567,018 B1
(45) Date of Patent: Feb. 14, 2017

(54) TRACTOR FRONT LINKAGE QUICK ATTACH COUPLING SYSTEM

(71) Applicant: Norbert Pigeon, Ste-Madeleine (CA)

(72) Inventor: Norbert Pigeon, Ste-Madeleine (CA)

(73) Assignee: EQUIPEMENT VTC MFG INC., St-Paul-d'Abbotsford, Quebec (CA)

( * ) Notice: Subject to any disclaimer, the term of this patent is extended or adjusted under 35 U.S.C. 154(b) by 0 days.

(21) Appl. No.: 15/255,892

(22) Filed: Sep. 2, 2016

(51) Int. Cl.
    *E02F 3/36* (2006.01)
    *B62D 49/06* (2006.01)
    *E02F 3/80* (2006.01)

(52) U.S. Cl.
    CPC ............. *B62D 49/065* (2013.01); *B62D 49/06* (2013.01); *E02F 3/80* (2013.01)

(58) Field of Classification Search
    CPC ......... A01B 5/062; B62D 49/04; B62D 49/06; B62D 49/065; B66F 9/065; E01H 5/04; E01H 5/06; E01H 5/063; E01H 5/066; E02F 3/46; E02F 3/422; E02F 3/3417; E02F 3/3677; E02F 3/8155; E02F 3/04; E02F 3/7613; E02F 3/7618; E02F 3/76; E02F 3/80; E02F 3/627
    USPC ... 37/231–235, 270, 276, 468; 172/272–275, 786, 815; 414/697, 723
    See application file for complete search history.

(56) References Cited

U.S. PATENT DOCUMENTS

| | | | |
|---|---|---|---|
| 4,202,454 A | 5/1980 | Browne et al. | |
| 4,780,046 A | 10/1988 | Friesen et al. | |
| 5,647,153 A * | 7/1997 | Gervais | E01H 5/066 172/272 |
| 5,909,960 A * | 6/1999 | Jager | E01H 5/06 172/272 |
| 5,915,837 A | 6/1999 | Brown et al. | |
| 6,058,633 A | 5/2000 | Barden | |
| 6,170,178 B1 * | 1/2001 | Christy | E01H 5/06 172/272 |
| 6,830,111 B2 | 12/2004 | Page | |
| 6,874,582 B2 * | 4/2005 | Hollinrake | A01B 59/062 172/245 |
| 7,146,754 B2 * | 12/2006 | Schultz | E01H 5/063 37/231 |
| 7,562,718 B1 | 7/2009 | Moorman et al. | |
| 7,841,110 B2 * | 11/2010 | Koch | E01H 5/06 172/272 |
| 8,689,898 B2 * | 4/2014 | Benesch | B66F 9/065 172/272 |
| 8,763,280 B1 * | 7/2014 | Fournier | E01H 5/06 172/272 |

* cited by examiner

*Primary Examiner* — Robert Pezzuto
(74) *Attorney, Agent, or Firm* — Fraser Clemens Martin & Miller LLC; James D. Miller

(57) ABSTRACT

A tractor front linkage quick attach coupling system for interlocking a tractor to a tool front linkage assembly. The coupling system comprises linkage assembly anchoring arms engaging complementary tractor inclined ramps. The arms have notches engaging upper rim members and lower cam members. The cam members are movable between arms/ramps locking/unlocking conditions. A cam member release preventing safety device is provided, to prevent accidental release of the coupling system. This safety device includes sliding stops, over-center compression spring mounted connector rod members, a transverse link, a push link and a hand lever for deactivating the safety device.

14 Claims, 13 Drawing Sheets

TRACTOR FRONT LINKAGE QUICK ATTACH COUPLING SYSTEM

FIELD OF THE INVENTION

This invention relates to a system for easy coupling of a linkage between a tractor and an operating tool.

SUMMARY OF THE INVENTION

A multi-purpose tractor is provided, which may be adapted to a variety of tools while optimizing performance as if a single purpose tractor and tool assembly.

In one embodiment, there is provided a tractor front linkage quick attach coupling system for interlocking a tractor to a tool front linkage assembly, the coupling system comprising: a pair of elongated anchoring arms each with a main leg and opposite ends transverse arms extending in opposite directions and each main leg carrying an intermediate external transverse stopper member, for mounting to the linkage assembly; a pair of inclined ramps for mounting to the tractor and in releasable complementary sliding engagement with respective said anchoring arms main legs, and each ramp defining rearwardly facing lower and upper notches; a pivotal rod, pivotally interconnecting a lower portion of said ramps releasably about said lower notches; a pair of rim members, anchored to said ramps and pivotally releasably engaging said upper notches; a pair of cam members, rotatably carried at opposite ends of said pivotal rod, and registering with corresponding said stopper members, and pivotable between a first locked condition, lockingly wedging with said stopper members so that said ramps and said anchoring arms become interlocked, and a second unlocked condition, clearing said stopper members so that said ramps and said anchoring arms disengage from one another.

A safety cam member release preventing device may be provided, that prevents accidental release of each said cam member from its locked said first condition with corresponding said stopper member. A hydraulic ram may also be added, defining a cylinder for mounting to the tractor adjacent said rim members and a piston rod, pivotally connected to said pivotal rod via a pivotal bracket, said ram controlling rotation of said pivotal rod and associated cam members.

In one embodiment, said safety cam member release preventing device consists of a pair of support blocks, each one carried beneath a lower portion of each of said ramps closely spaced from corresponding said cam members, a pair of sliding stops each movably mounted over each corresponding said support block, each said sliding stop including a rearwardly projecting ear, a pair of over-center compression spring mounted connecting rod members each pivotally mounted at a bottom end to a corresponding said ear and tiltable between a first limit position generally forming a V-shape with said sliding stop and corresponding to said cam member locked condition, and a second limit position generally parallel to said sliding stop and corresponding to said unlocked condition thereof, wherein said sliding stops operate as mechanical stoppers to prevent the cam members from moving toward a release position; a transverse link joining both said connecting rod members, a hand lever transversely carried at an intermediate section thereof by said transverse link and pivotally connected at a lower end thereof to one of said connecting rod members; and a push link pivotally mounted at one end to said pivotal bracket and at its opposite end to a pivot pin transversely slidingly engaging an elongated ovoidal slot made along a rear length section of said push link; wherein pull action of a free upper end portion of said hand lever from said first limit position forming a V-shape relative to said sliding stop to said second limit position parallel relative to said sliding stop enabling moving of said cam members to a release position by angularly tilting said connecting rod members and associated sliding stops away from said cam members.

Each said stopper member may be of generally triangular shape. A pair of shoulder bolts may be added, each fitted between said transverse link and a corresponding one of said connector rod members. A wear bushing may be mounted around said pivotal rod between said pivot bracket and the corresponding said cam member.

The invention also relates in another embodiment to a vehicle comprising a tractor, and a linkage assembly releasably connected to the tractor by a tractor front linkage quick attach coupling system and for connection to a front tool; said tractor defining a chassis supporting a pair of laterally opposite upwardly rearwardly inclined ramps, each of said ramps defining a lower end portion and an upper end portion, a pivotal rod rotatably mounted to said chassis beneath said ramps lower end portion, said pivotal rod defining opposite end portions each carrying a cam member rotatably mounted thereto; a pair of rim members fixedly mounted to each said ramp upper end portion; said linkage assembly having a main frame, said coupling system comprising a pair of anchoring arms upwardly projecting from said linkage assembly main frame, each of said anchoring arms having a main leg, a downwardly inclined first end portion and an upwardly inclined second end portion opposite the first end portion thereof on opposite ends of said main leg, each anchoring arm first and second end portions defining rearwardly facing first and second notches respectively, a stopper member being carried transversely outwardly of an intermediate section of each said anchoring arm main leg, each said anchoring arm main leg complementary in shape to a corresponding one of said ramps wherein each said first notch is releasably transversely engaged with a corresponding end portion of said pivotal rod and each said second notch is releasably transversely engaged with a corresponding said rim member whereby said cam members come in transverse register with a corresponding said stopper member; and each said cam member of such size and shape as to have a first unlocked condition, clearing the corresponding said stopper member and allowing disengagement of said linkage assembly from said tractor, and a rotated second locked condition upon rotation of said pivotal rod and in wedged locking engagement with said corresponding stopper member that brings about interlock of said linkage assembly with said tractor.

A safety cam member release preventing device may then be added, that prevents accidental release of each said cam member from its second said locked condition with corresponding said stopper member.

A hydraulic ram may be added, defining a cylinder fixedly mounted to said tractor chassis adjacent said rim members, and a piston rod, pivotally connected to said pivotal rod via a pivotal bracket, said ram controlling rotation of said pivotal rod and associated cam members.

Said safety cam member release preventing device may consist of a pair of support blocks, each one carried beneath a lower portion of each of said ramps closely spaced from corresponding said cam members, a pair of sliding stops each movably mounted over each corresponding said support block, each said sliding stop including a rearwardly projecting ear, a pair of over-center compression spring mounted connecting rod members each pivotally mounted at a bottom end to a corresponding said ear and tiltable between a first limit position generally forming a V-shape with said sliding stop and corresponding to said cam member second locked condition, and a second limit position generally parallel to said sliding stop and corresponding to said cam member first unlocked condition thereof, a transverse link joining both said connecting rod members, a hand lever transversely carried at an intermediate section thereof by said transverse link and pivotally connected at a lower end to one connecting rod member; and a push link pivotally mounted at one end to said pivotal bracket and at its opposite end to a pivot pin transversely engaging an elongated ovoidal slot made along a rear length section of said push link; wherein pull action of a free upper end portion of said hand lever from V-shape said first limit position relative to said sliding stop to said second parallel limit position relative to said sliding stop enabling moving of said cam members to a release position by angularly tilting said connecting rod members and associated sliding stops away from said cam members.

Each said stopper member may be of generally triangular shape. A pair of shoulder bolts may be added, each fitted between said transverse link and a corresponding one of said connector rods. A wear bushing may be mounted around said pivotal rod between said pivot bracket and the corresponding said cam member.

BRIEF DESCRIPTION OF THE DRAWINGS

FIGS. 5A, 5B and 5C are perspective views of the pivotal rod and associated pair of opposite cams, of the transverse link with associated pair of opposite over center connecting rods with compression spring and sliding stops, and of hydraulic ram with associated push link, respectively;

DETAILED DESCRIPTION OF THE EMBODIMENTS OF THE INVENTION

Figure 6:
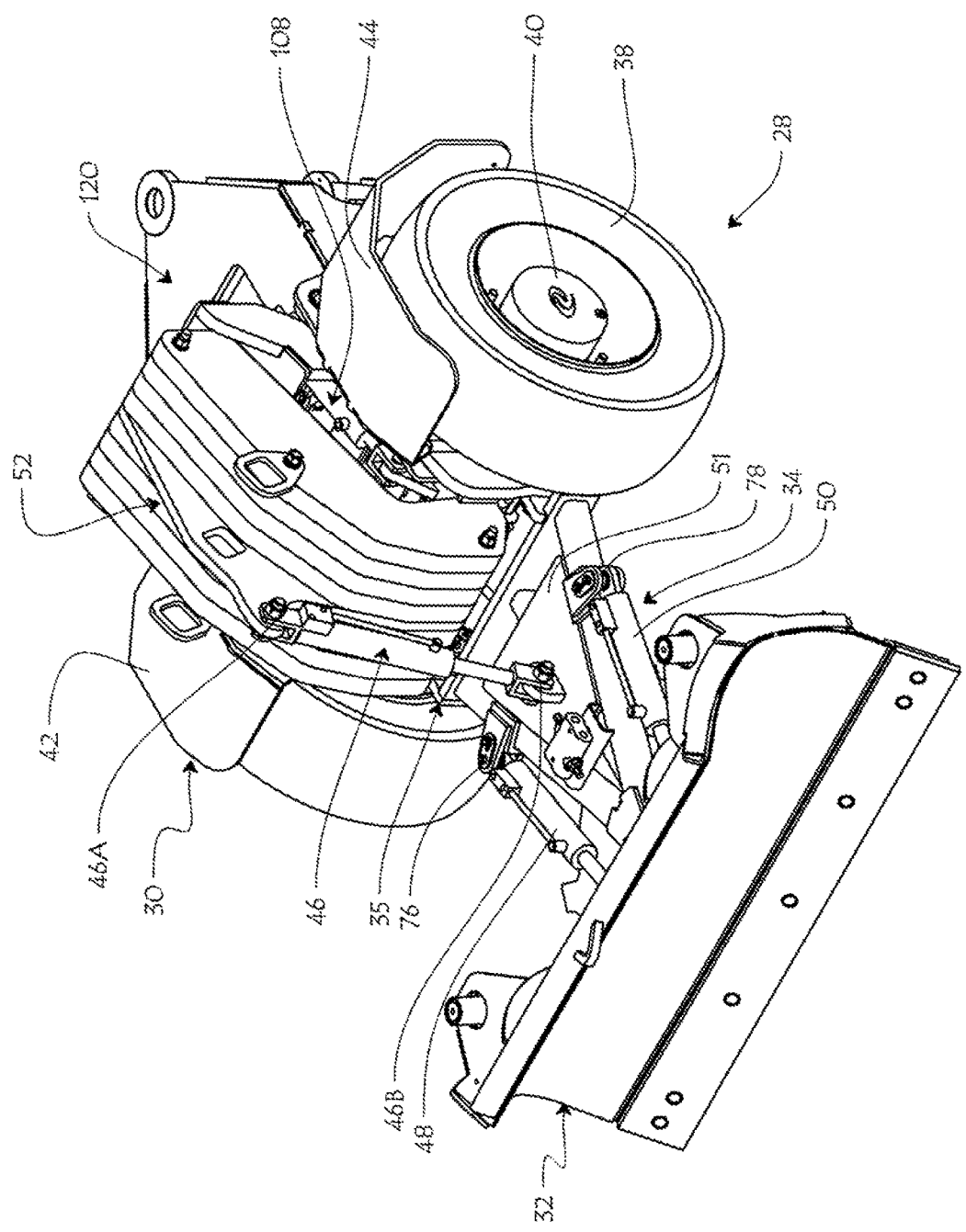
FIG. 6 is a view similar to FIG. 4 but at a smaller scale and showing the pair of wheels and supporting wheel axle and also showing the front snow plow carried by the front linkage.
Figure 7:
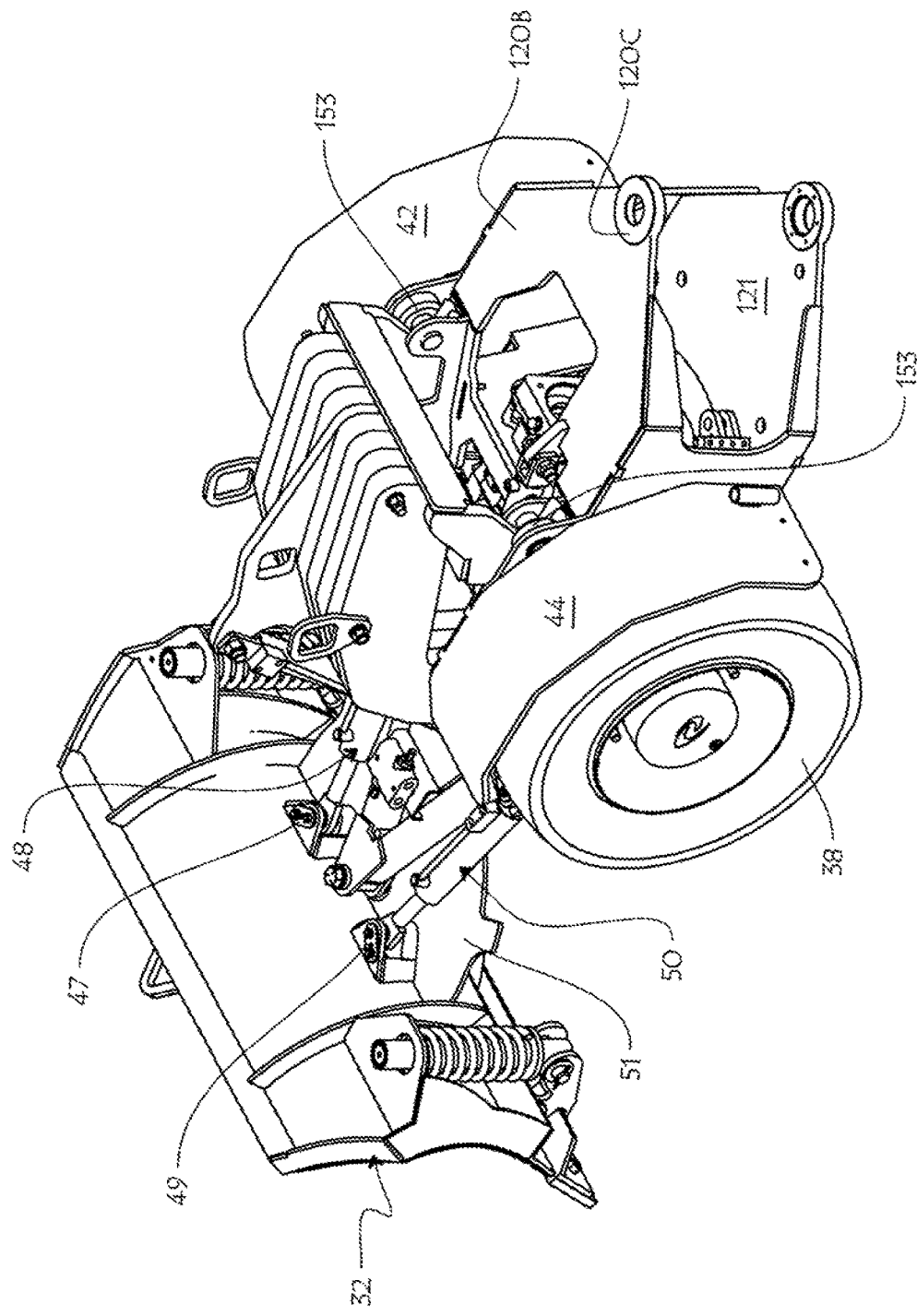
FIG. 7 a rear perspective view of the tractor of FIG. 6.
Figure 8:
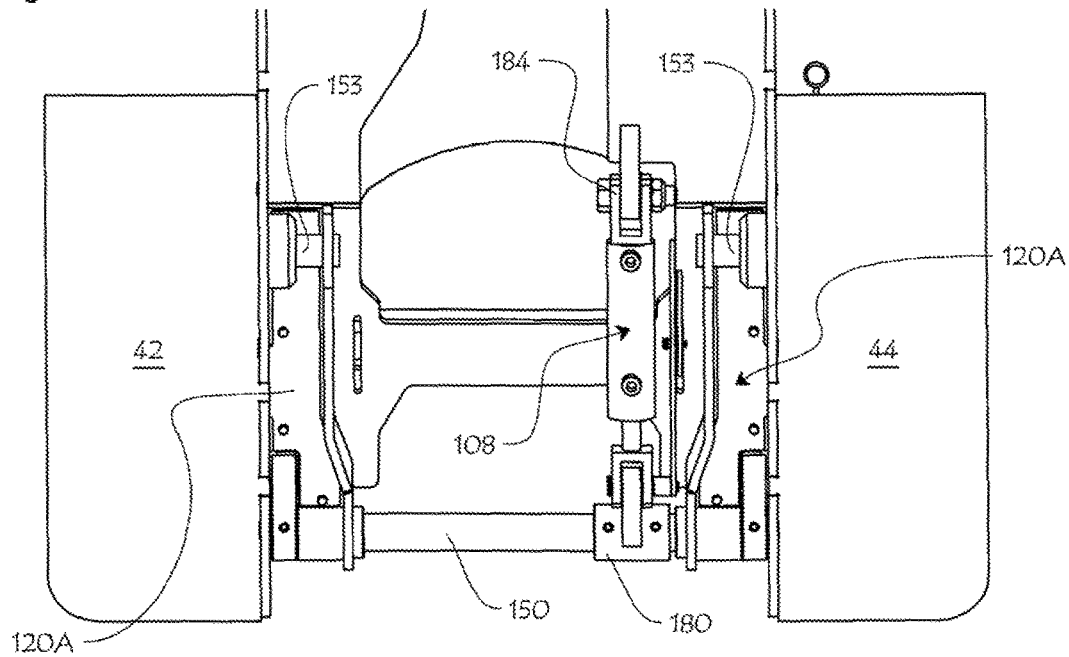
FIGS. 8 and 9 are enlarged schematic top plan view and front elevational view respectively of selected portions of the tractor, showing the accidental cam release preventing device.
Figure 9:
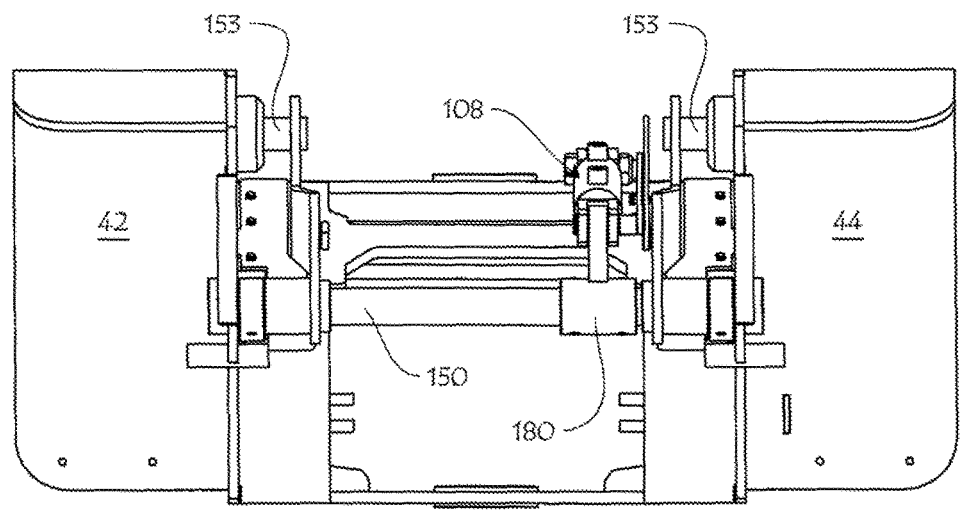
Figure 10:
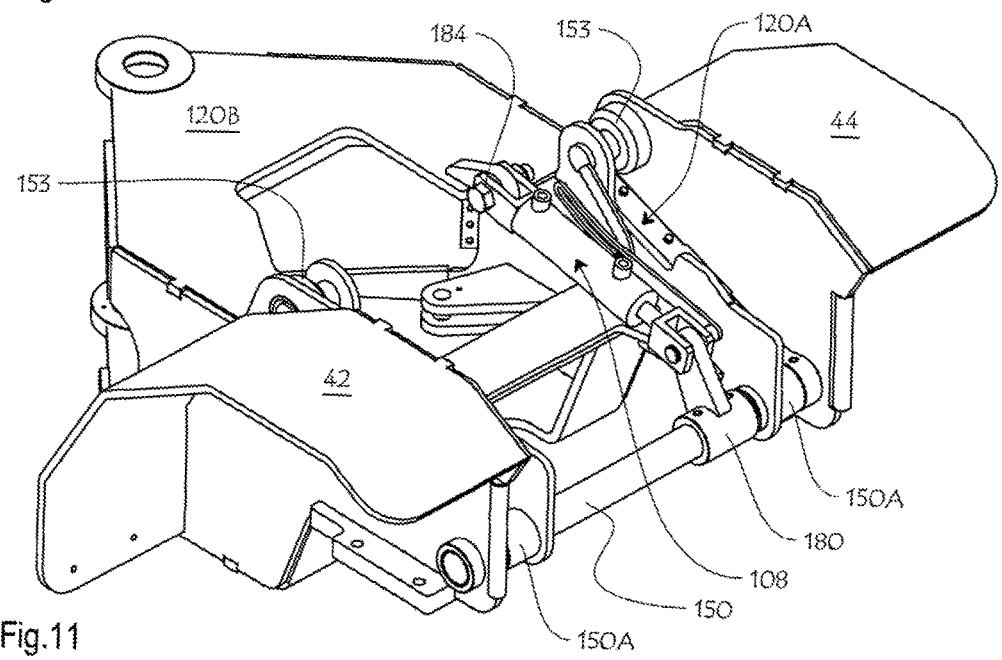
FIG. 10 is a view similar to FIG. 5 but at an enlarged scale and showing the tractor wheel upper wings.
Figure 11:
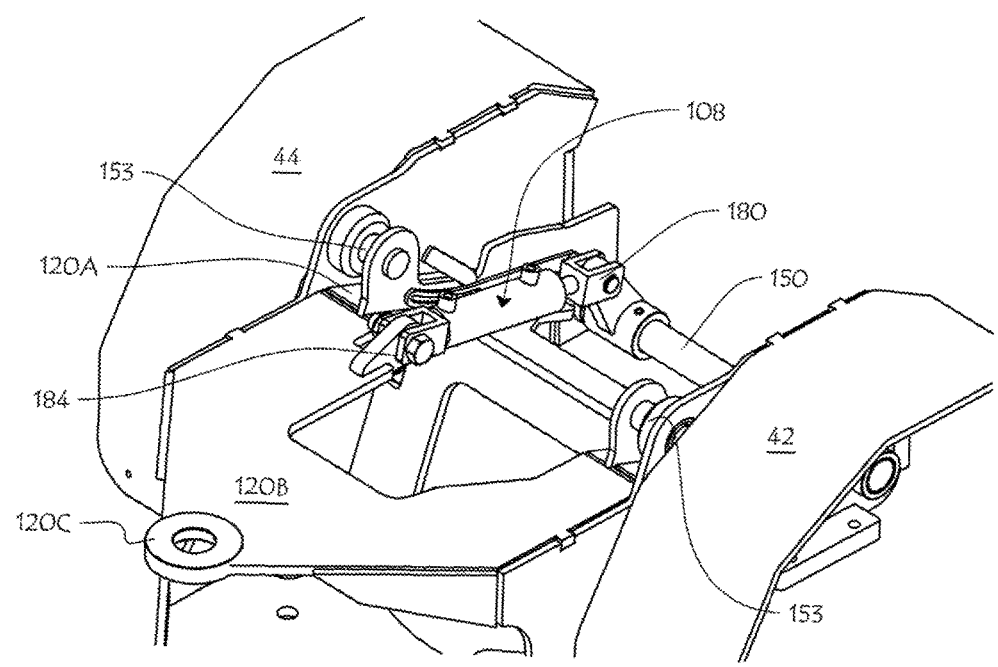
FIG. 11 is a view similar to FIG. 10 but from another perspective.

FIGS. 6 and 7 show one embodiment of vehicle 28 consisting of a multipurpose tractor 30 fitted with a front tool such as a snow plow 32 and associated front linkage assembly 34 releasably interconnecting the snow plow 32 to the tractor 30 in articulated fashion about a lower horizontal transverse pivotal axle member 35 (see FIGS. 13 and 14) and about an upper transverse horizontal ram cylinder pivotal mount 46A.

Tractor 30 is supported over ground by a pair of opposite wheels 36, 38, carried by a transverse wheel axle 40. Upper wings 42, 44 are provided spacedly over the wheels 36, 38, being edgewisely anchored to the fairing of the tractor main frame 52.

Hydraulic ram 46 connects by lower pivot mount 46B to a lower platform 51 from front linkage assembly 34 to the main frame 52 of tractor 30, at upper pivot mount 46A, while hydraulic rams 48, 50, interconnect pivotal bracket mounts 47, 49, on opposite lateral side portions of plow 32 with laterally offset pivotal bracket mounts 76, 78, on platform 51, for controlled lift and lateral tilt motion of the snow plow 32.

Figure 6A:
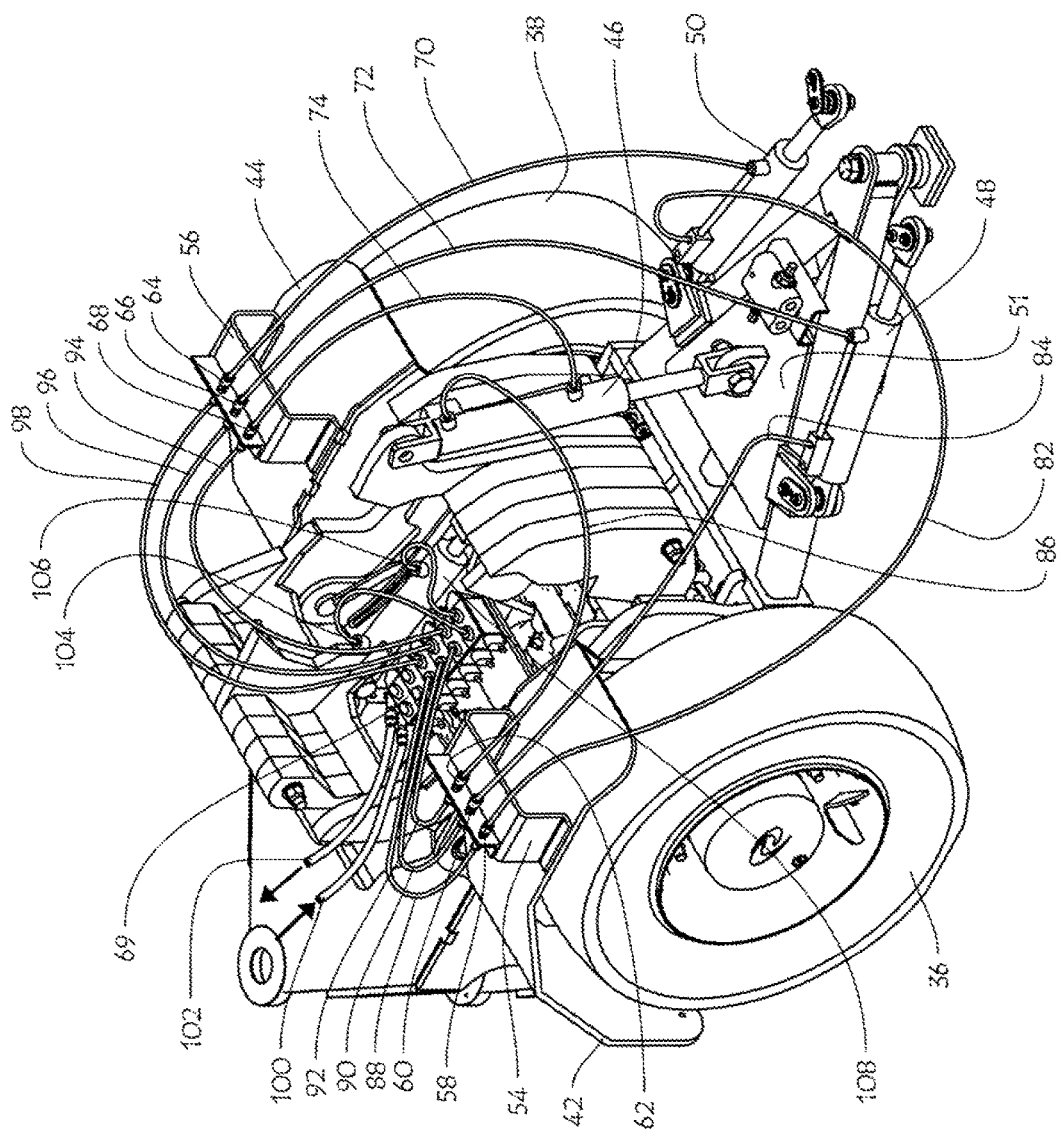
FIG. 6A is a view similar to FIG. 6 but with the snow plow removed for clarity of the view, and further showing the hydraulic pressure lines to tool functions and return lines from tool functions interconnecting the four hydraulic rams to a directional control valves assembly via two sets of quick disconnect line couplings carried over the wheel wings.

FIG. 6A further shows each wheel wings supporting a bracket 54, 56, each of which itself supports in one embodiment a set of three quick disconnect line couplers 58, 60, 62, and 64, 66 and 68 respectively. A directional control valves assembly 69 is further provided within an open area within the tractor main frame 52 between the two wheels 36, 38. Three hydraulic pressure lines 70, 72 and 74 to tool functions releasably interconnect line couplers 64, 66 and 68 to the three hydraulic rams 50, 48 and 46, respectively, on the front linkage platform 51, while three hydraulic return lines 82, 84 and 86 from tool functions releasably interconnect line couplers 58, 60 and 62 to the same rams 50, 48 and 46 respectively. Further hydraulic lines 88, 90, 92, and 94, 96, 98, interconnect couplers 58, 60 and 62, and 64, 66 and 68, respectively to directional control valves assembly 69 in the tractor 30. An inbound pump pressure to directional control valves assembly line 100 is further provided, as well as outbound valve return to hydraulic tank line 102.

A further pair of pressure line and return line, 104, 106 interconnect a tractor hydraulic ram member 108 (detailed later) to the directional control valves assembly 69.

Figure 1:
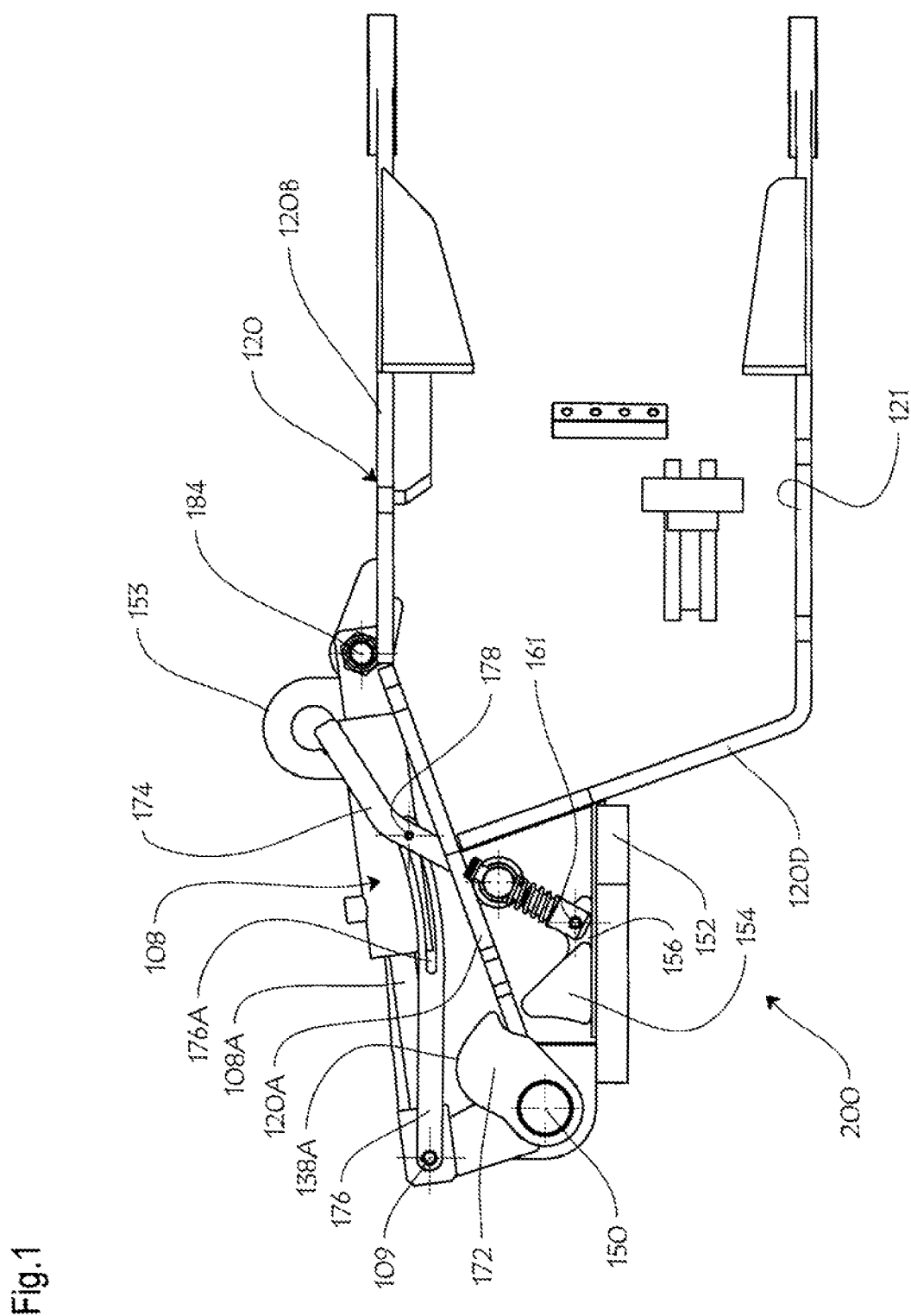
FIGS. 1 to 3 are schematic side elevational views of one embodiment of the safety cam release preventing device and associated open tractor supporting frame, sequentially showing how the cam release preventing device can be disengaged from its locked cam condition shown in FIG. 1, to its unlocked cam condition (FIG. 3) through an intermediate cam unlock enabling condition (FIG. 2), with the safety cam member release preventing device being reset to engage the first position.
Figure 2:
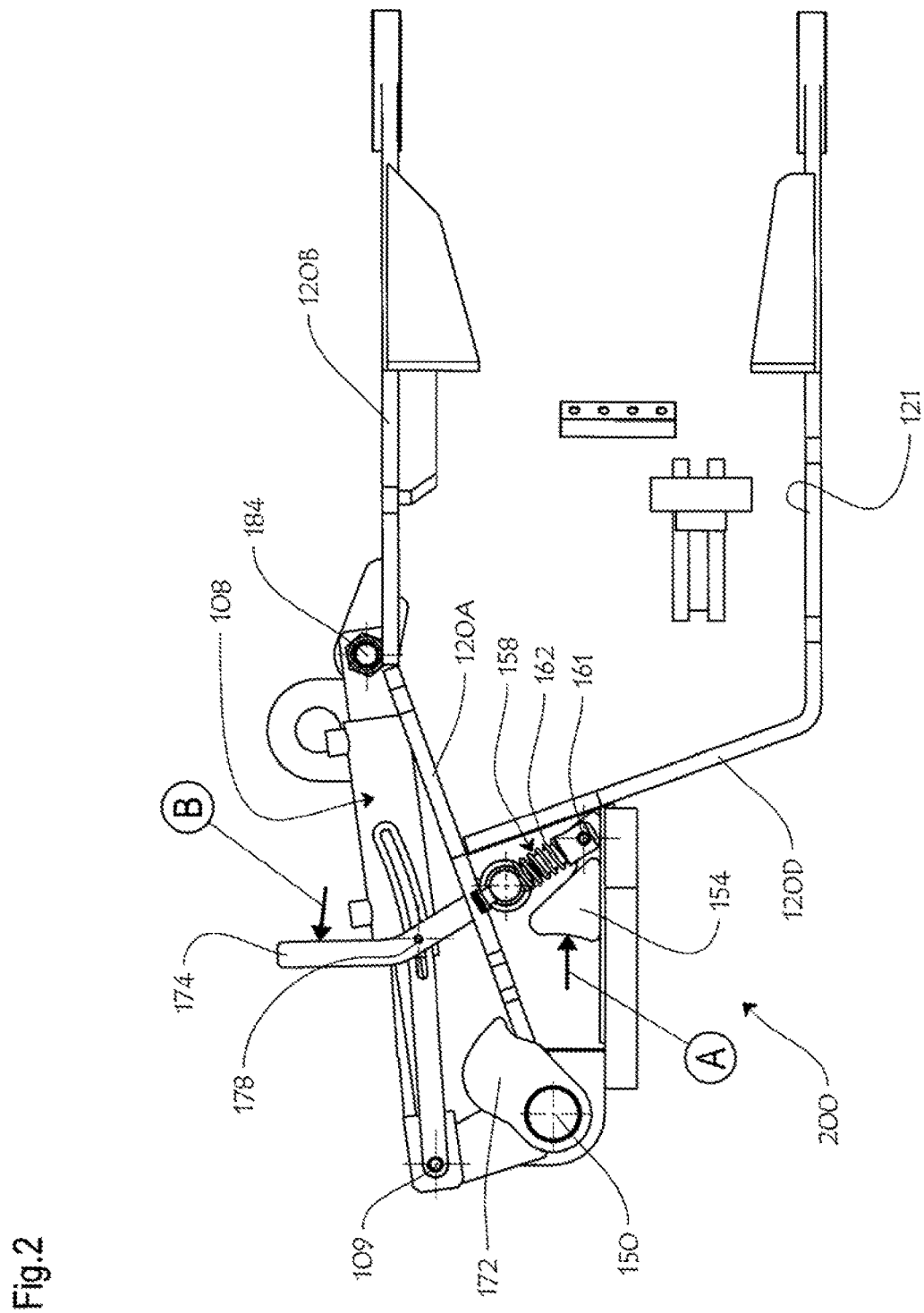
Figure 3:
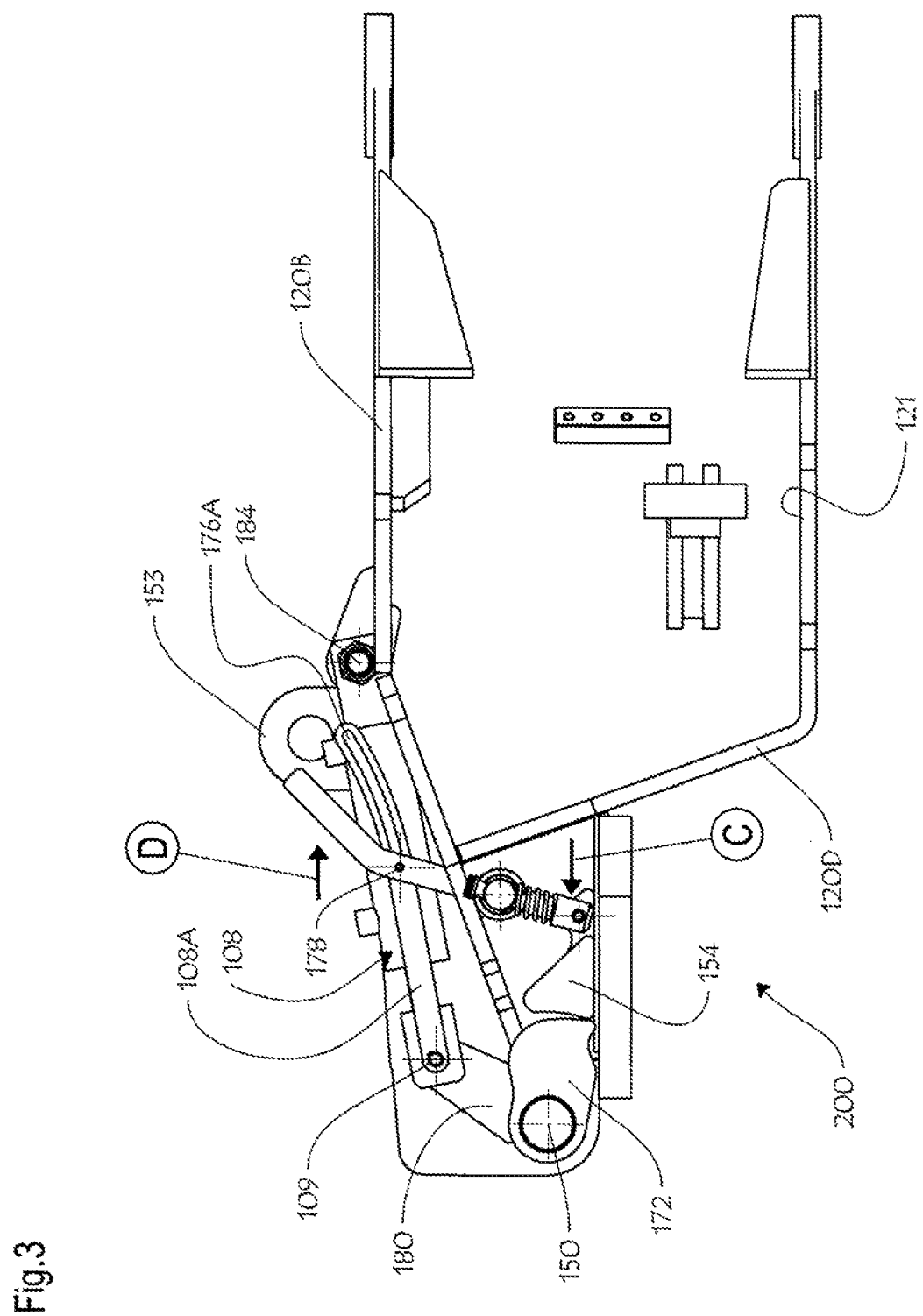

A shown in FIGS. 1-3 and 10-11, tractor 30 further includes slidable ramp members 120, 120, on opposite lateral sides thereof. Each ramp member 120, 120, defines an exposed top face and an upwardly outwardly (relative to tool 32) extending first portion 120A, 120A, a second coextensive generally horizontal upper surface 120B, 120B opposite tool 32 and merging at 120C to form a U-shape. FIGS. 1-3 show that a platform 121 is also formed spacedly beneath upper ramp portions 120B-120C, and connected to an intermediate section of ramp 120A by a downwardly rearwardly inclined leg 120D.

Figure 12:
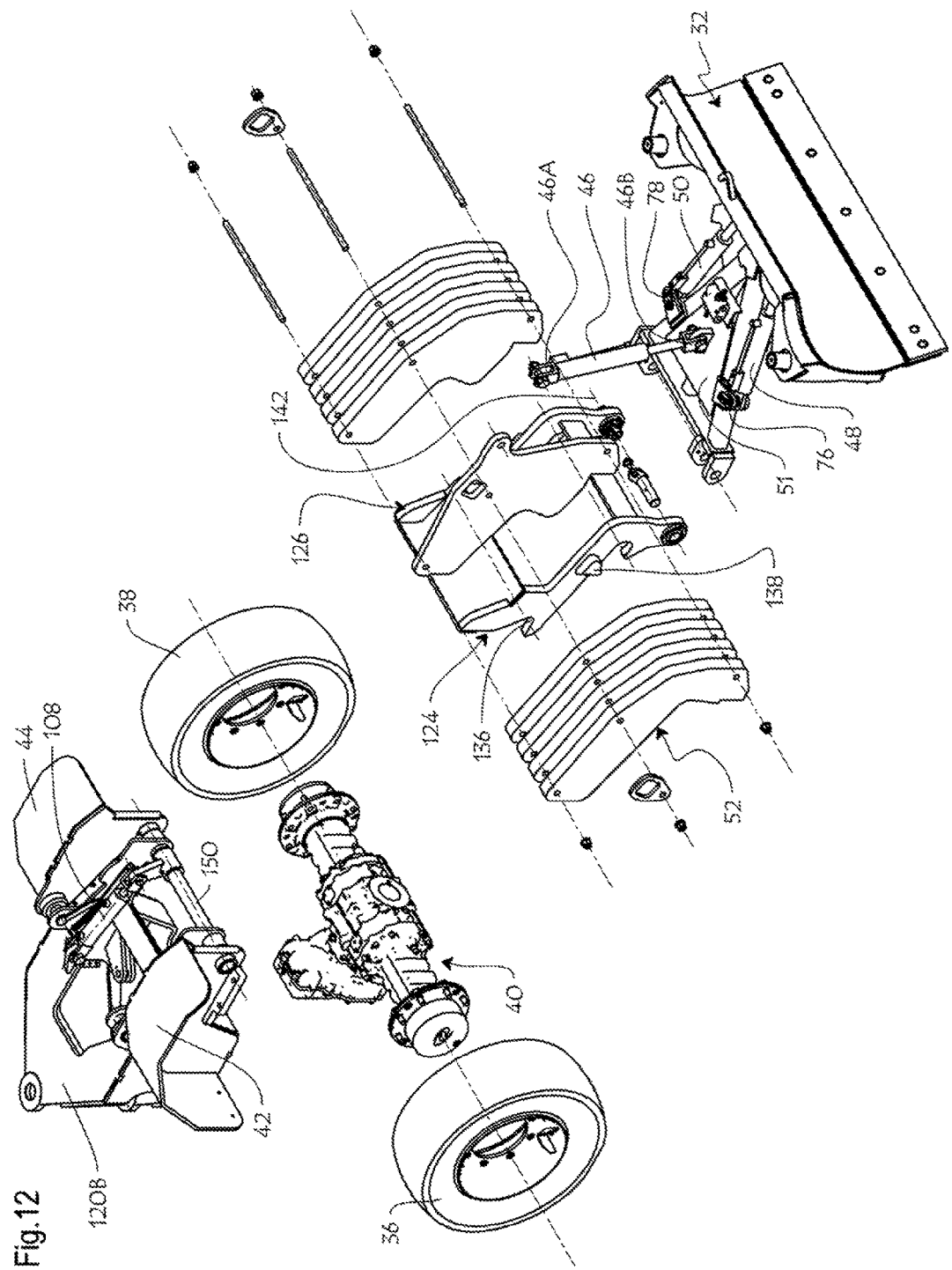
FIG. 12 is an exploded view of the tractor, snow plow and front linkage assembly.
Figure 13:
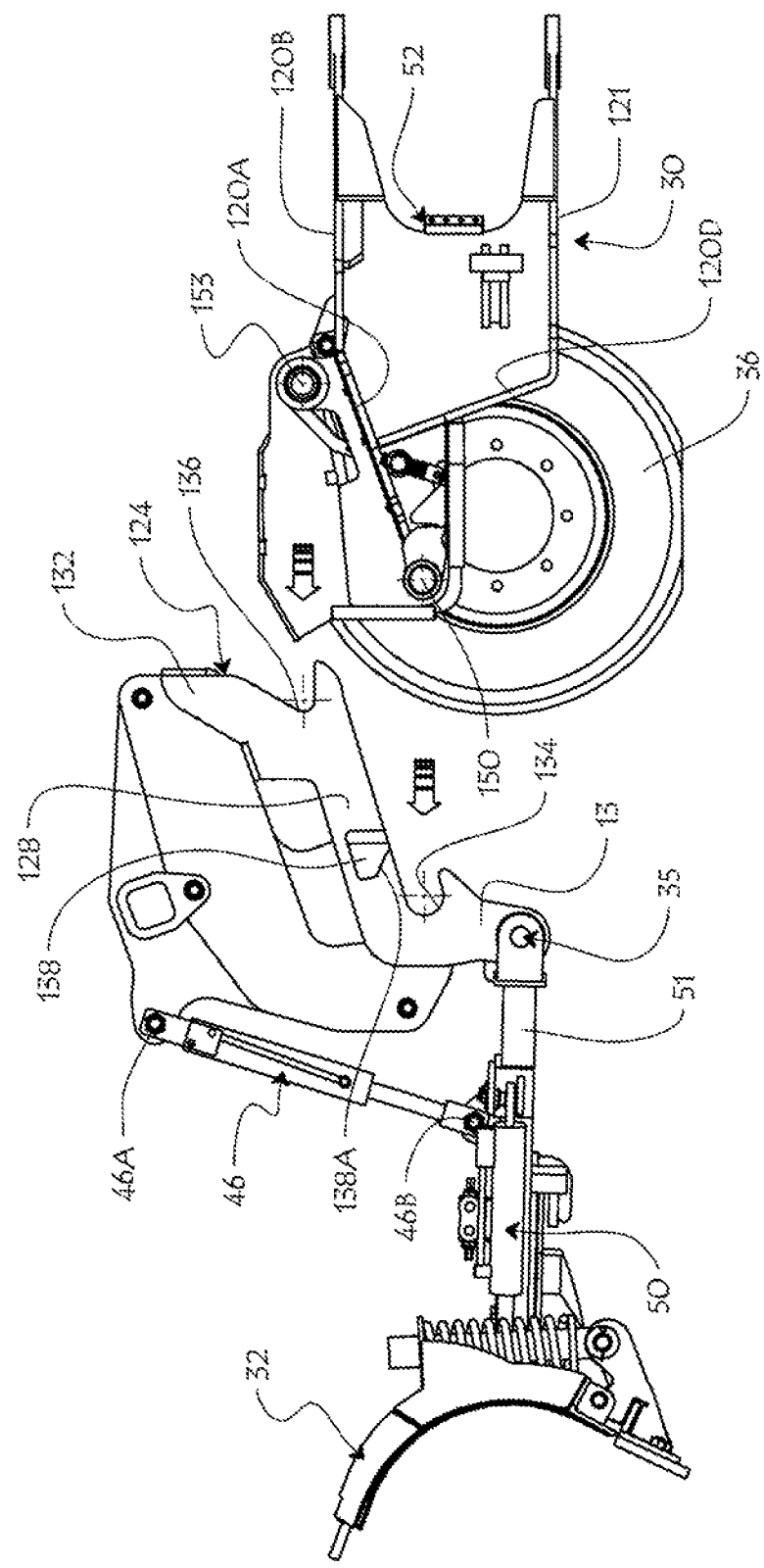
FIGS. 13 and 14 are schematic side elevational views of the tractor and snow plow and front linkage, sequentially suggesting how the front linkage anchoring arm becomes interlocked onto the tractor supporting arm by engagement of the anchoring arm upper and lower notches into the outer end portions of the lower pivot rod and of upper rim members.
Figure 14:
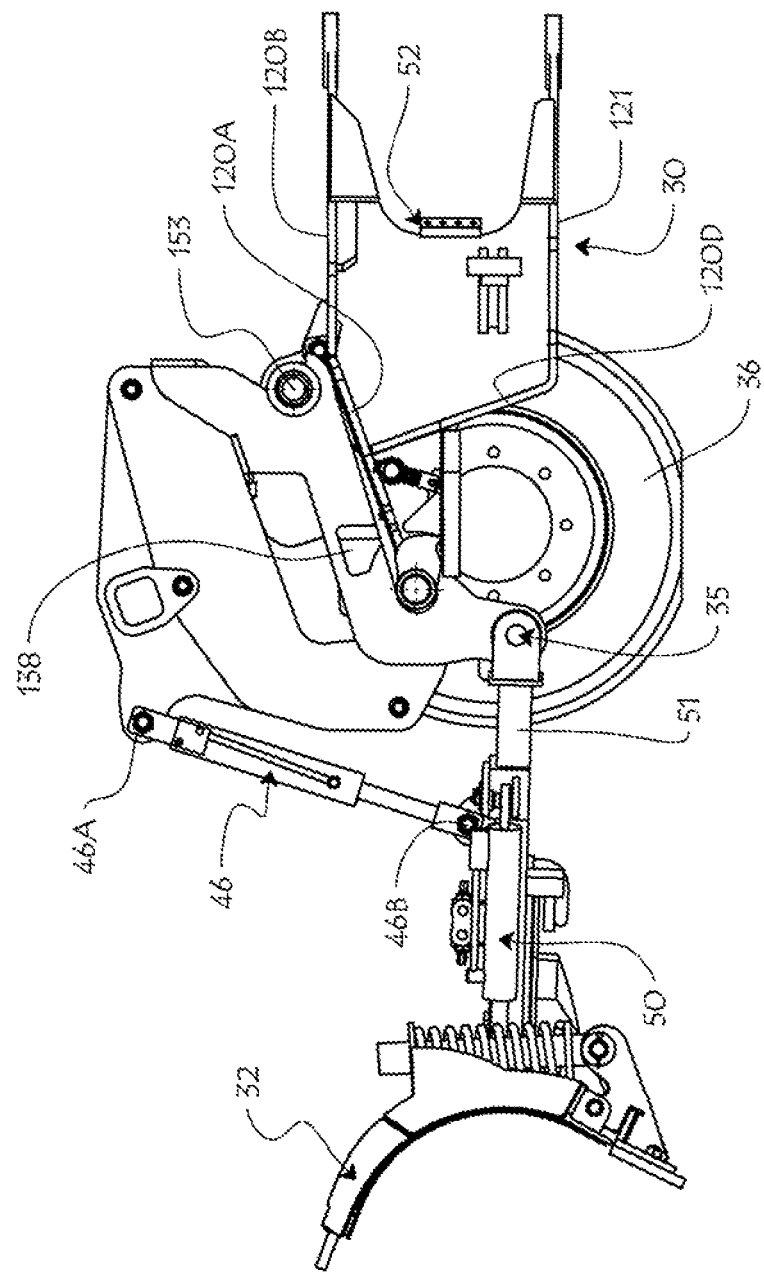

As shown in FIGS. 12-14, a pair of anchoring arms 124, 126, is further provided. Each anchoring arm 124, 126, includes a main leg 128, a downwardly elbowed inner leg section 130 at the inner end portion (i.e. towards tool 32) of main leg 128, and an upwardly elbowed outer end portion 132 opposite inner leg section 130. Outwardly facing arcuate notches 134, 136, are formed at the juncture of main leg 128 and leg portion 130 and of main leg 128 and leg portion 132, respectively. Each main leg 128 further carries on an intermediate section of its exposed laterally outward surface a triangular stopper member 138.

As shown in FIGS. 1-3, 5-5C and 10-11, tractor 30 further includes:
- a transverse lower pivotal rod 150, sized for releasable engagement of its opposite end portions 150A, 150A, into notches 134, and mounted at the lower end portion of lower ramp section 120A;
- a pair of opposite rim members 153, 153, fixedly mounted to ramp section 120A adjacent ramp section 120B;
- ramp portion 120A may include a pair of opposite wear pad blocks (not shown), also supported by the tractor main frame 52 on its side, with these wear pad blocks extending transversely from pivotal rod end portions 150A, 150A beneath the ramp leg 120A;
- a pair of sliding stops 154, 154, slidably mounted onto wear pad blocks 152 and each forming a projecting ear 156;
- a pair of connecting rods 158, 158, pivotally mounted at 160 to ear 156 by pivot pin 161, and a compression spring 162 engaging each rod 158;
- an elongated transverse link 164 interconnecting the outer ends of each connecting rods 158, 158, opposite wear pad blocks 152, with links 164 retained to rods 158 by a shoulder bolt 166 and pivot pin 168. A wear bushing assembly (now shown) may be added to pin 168 in one embodiment.
- a pair of cams 172, 172, are rotatably carried at each of the two opposite end portions 150A of the pivot rod 150;
- a single hand lever 174 is rotatably carried at one end to the transverse link 164;
- a push link 176 is pivotally carried at one pivot end member 178 to an intermediate section of hand lever 174, and to a pivot bracket 180 mounted to pivot rod 150 spacedly from one of the cams 172 with wear bushing 182 therebetween; the push link 176 including an elongated ovoidal slot 176A extending from an intermediate section of push link to the pivot end member 178;
- a hydraulic ram 108 is pivotally carried at its piston yoke rod end 108A with a pivot mount 109 to pivot bracket 180, and at its opposite cylinder end portion to a pivotal mount member 184 with bolt 185 fixedly carried by ramp leg 120B (see e.g. FIG. 11). Ram 108 extends generally parallel to push link 176 in closely spaced fashion.

A quick coupling system is thus provided for releasable coupling of the tractor supporting frame 52 to an operating tool such as a loader arm, an upright mast with forks, a snow plow 32, a snow blower, an ice breaker, and the like. The coupling is brought about by bringing the tractor 30 toward the tool 32 (arrows in FIG. 13) which stands on the ground with or without ground support legs. The opposite elbowed anchoring arms 124, 126, will slide on the angled supporting arm ramp 120A over the tractor supporting frame and will lockingly wedge at one rear end 130 by engagement of lower pivotal rod 150 into anchoring arms notches 134, and will also lock at the front end 124 with upper rim members 153. The opposite cams 172 then pivot upwardly to lockingly wedge against registering stoppers 138 on each side of the anchoring arms 124, 126.

A safety cam release preventing device 200 is provided. This cam release preventing device illustrated in FIGS. 1-3 comprises two assemblies, one on each opposite lateral sides of the front support frame, of articulated sliding stops 154 connected to connecting rod 158 with over-center compression spring member 162. The two assemblies of sliding stops 154 and connecting rod 158 with over-center spring on opposite lateral sides are interconnected by transverse link 178, to bring about simultaneous movements. The transverse link 178 also operates as a pivot for the connecting rod 162.

Figure 4:
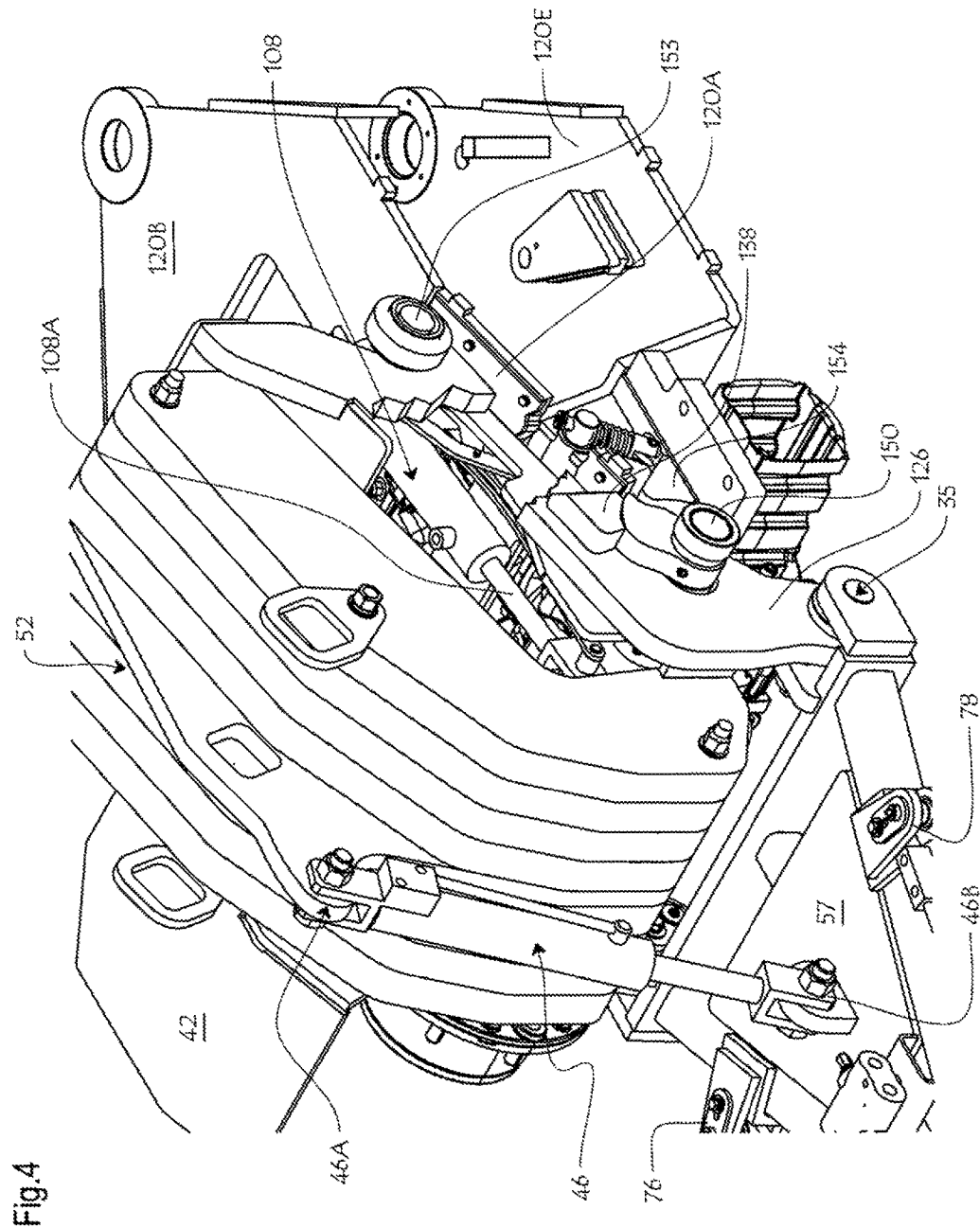
FIG. 4 is an enlarged front perspective view of the tractor of FIG. 1, but without its wheels and wheel axle, and showing part of its front linkage and associated triplet of hydraulic rams, and tractor supporting frame, with the anchoring arm partly broken for clarity of the view to show the cam actuating fourth hydraulic ram within the tractor.
Figure 5:
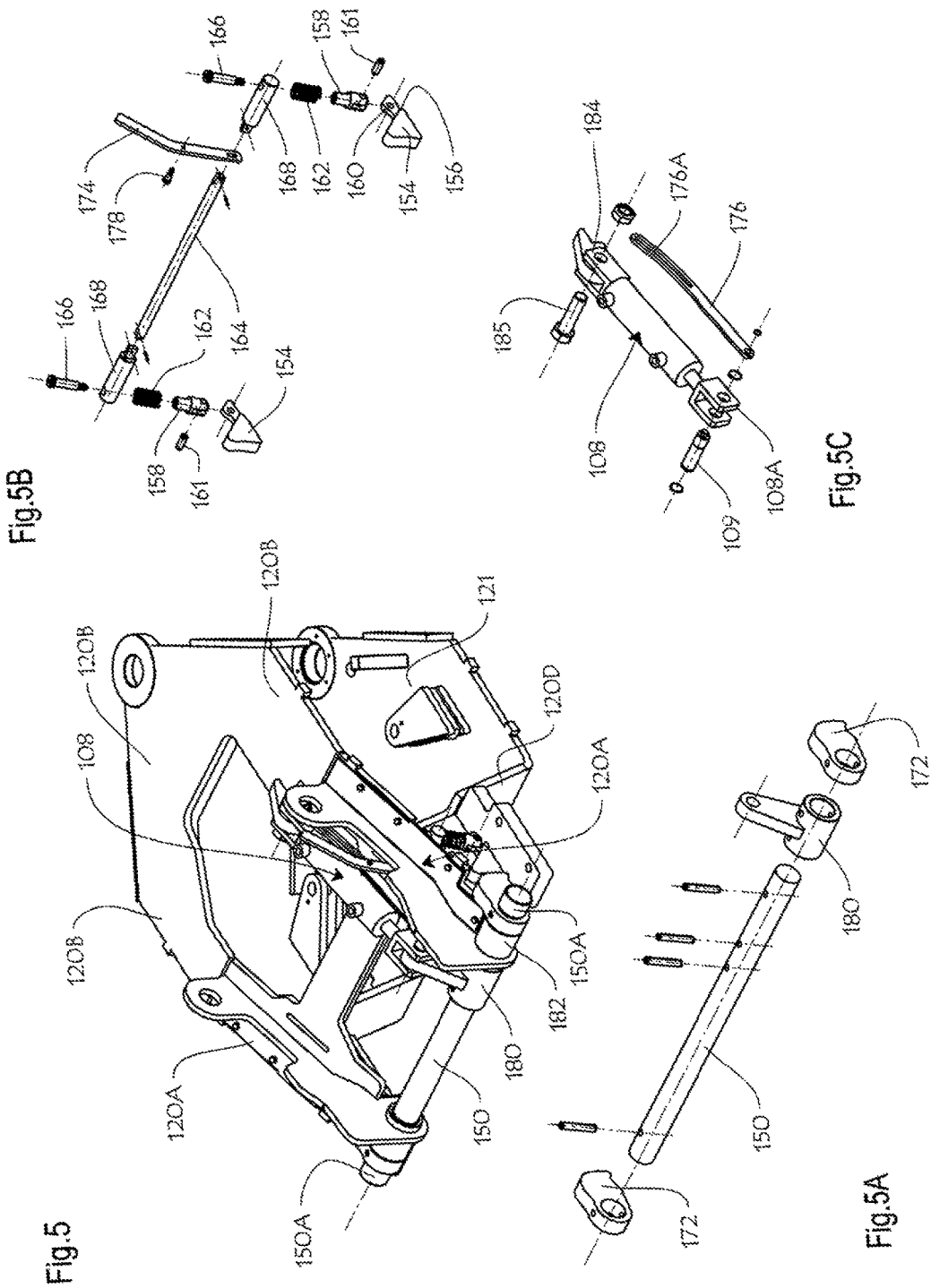
FIG. 5 is a perspective view at a smaller scale of the components of FIGS. 1-3.

In the interlocked condition of cams 172 and stopper members 138 shown in FIGS. 1 and 4, anchoring arm 128 engages tractor 30 by engagement of arm notches 134, 136, into complementary tractor rods 150 and rim members 153. The piston rod 108A of hydraulic ram 108 is extended, which pushes pivotal bracket 180 to rotate cams 172 counterclockwise to their upwardly rearwardly inclined locked condition shown in FIGS. 1 and 4. The outer end portion 172A of cams 172 will lockingly wedge against a complementary surface 138A (FIGS. 1 and 13) of stopper blocks 138. Hand lever 174 occupies an upwardly rearwardly inclined first limit position; and sliding stops 154 occupy their forwardmost position. Each sliding stop 154 forms with its corresponding connecting rod 158 a generally V-shape assembly (FIG. 1); and hand lever pin 178 abuts against the rearmost end of ovoidal slot 176A from push link 176.

The sliding stops 154 are used as mechanical stoppers to prevent the cams 172 from moving toward a release position. To voluntarily enable the cams 172 to move to a release position, there is provided a hand lever 174 connected to the transverse link 178. As shown in FIG. 2, the sliding stops 154 must be moved manually (arrow A) with forward push of hand lever 174 (arrow B) by the operator before being able to unlock the tool 32. The forward pivotal motion of the hand lever 174 will change the orientation of the spring 162 to maintain the sliding stops 154 in the unlocked position shown in FIG. 2. The cams 172 maintain their upwardly rearwardly inclined condition (same as in FIG. 1) since the ram piston rod 108A maintains its extended condition while pin 178 slides toward the forward end of ovoidal slit 176A of push link 176. The orientation of sliding stops 154 shifts to become generally parallel (FIG. 2) to its corresponding connecting rod 158, and pin 178 of hand lever 174 reaches a position along an intermediate section of the length of ovoidal slit 176A of push link 176.

When the sliding stops 154 are withdrawn, the operator may actuate the hydraulic ram 108 to lower the cams 172 by retracting the ram piston rod 108A (see the clockwise rotation thereof from FIG. 2 to FIG. 3 which draws pivot bracket 180 therewith in clockwise rotation). Sliding stops 154 thus continue to move towards corresponding cams 172 with continued pull action on hand lever 174, whereby sliding stops 154 and connecting rods 158 move toward the cams 172 (arrow C in FIG. 3) to resume their generally V-shape assembly relative orientation. The handle lever pin 178 reaches a forwardmost end second limit position in push link ovoidal slot 176A opposite its first limit position of FIG. 1, by continued pulling action on hand lever 174 (arrow D). This will then allow the tool 32 to slide toward ground along the tractor supporting frame ramp 120A. The device is actuated automatically when the hydraulic ram 108 is actuated to lower the cams 172 because of the push link 176 being provided. In the elongated ovoidal slit 176A of push link 176, the pivot mount 178 is movable therethrough. The push link 176 pushes against the hand lever 174 to bias the spring 162 to the opposite side and to maintain the sliding stops 154 in compression against the lowered cams 172. When the operator actuates the hydraulic ram 108 to lock the tool 32, the cams 172 pivot upwardly to their position shown in FIG. 1 and the over-center springs 158 bias the sliding stops 154 to slide beneath the cams 172 to complete the tool coupling operation.

What is claimed is:

1. A tractor front linkage quick attach coupling system for interlocking a tractor to a tool front linkage assembly, the coupling system comprising:
   a pair of elongated anchoring arms each with a main leg and opposite ends transverse arms extending in opposite directions and each main leg carrying an intermediate external transverse stopper member, for mounting to the linkage assembly;
   a pair of inclined ramps for mounting to the tractor and in releasable complementary sliding engagement with respective said anchoring arms main legs, and each ramp defining rearwardly facing lower and upper notches;
   a pivotal rod, pivotally interconnecting a lower portion of said ramps releasably about said lower notches;
   a pair of rim members, anchored to said ramps and pivotally releasably engaging said upper notches; and
   a pair of cam members, rotatably carried at opposite ends of said pivotal rod, and registering with corresponding said stopper members, and pivotable between a first locked condition, lockingly wedging with said stopper members so that said ramps and said anchoring arms become interlocked, and a second unlocked condition, clearing said stopper members so that said ramps and said anchoring arms disengage from one another.

2. A coupling system as in claim 1, further including a safety cam member release preventing device, that prevents accidental release of each said cam member from its locked said first condition with corresponding said stopper member.

3. A coupling system as in claim 2, further including a hydraulic ram, defining a cylinder for mounting to the tractor adjacent said rim members and a piston rod, pivotally connected to said pivotal rod via a pivotal bracket, said ram controlling rotation of said pivotal rod and associated cam members.

4. A coupling system as in claim 3, wherein said safety cam member release preventing device consists of a pair of support blocks, each one carried beneath a lower portion of each of said ramps closely spaced from corresponding said cam members, a pair of sliding stops each movably mounted over each corresponding said support block, each said sliding stop including a rearwardly projecting ear, a pair of over-center compression spring mounted connecting rod members each pivotally mounted at a bottom end to a corresponding said ear and tiltable between a first limit position generally forming a V-shape with said sliding stop and corresponding to said cam member locked condition, and a second limit position generally parallel to said sliding stop and corresponding to said unlocked condition thereof, wherein said sliding stops operate as mechanical stoppers to prevent the cam members from moving toward a release position; a transverse link joining both said connecting rod members, a hand lever transversely carried at an intermediate section thereof by said transverse link and pivotally connected at a lower end thereof to one of said connecting rod members; and a push link pivotally mounted at one end to said pivotal bracket and at its opposite end to a pivot pin transversely slidingly engaging an elongated ovoidal slot made along a rear length section of said push link; wherein pull action of a free upper end portion of said hand lever from said first limit position forming a V-shape relative to said sliding stop to said second limit position parallel relative to said sliding stop enabling moving of said cam members to a release position by angularly tilting said connecting rod members and associated sliding stops away from said cam members.

5. A coupling system as in claim 4, wherein each said stopper member is of generally triangular shape.

6. A coupling system as in claim 4, further including a pair of shoulder bolts each fitted between said transverse link and a corresponding one of said connector rod members.

7. A coupling system as in claim 4, further including a wear bushing mounted around said pivotal rod between said pivot bracket and the corresponding said cam member.

8. A vehicle comprising:
   a tractor; and
   a linkage assembly releasably connected to the tractor by a tractor front linkage quick attach coupling system and for connection to a front tool, said tractor defining a chassis supporting a pair of laterally opposite upwardly rearwardly inclined ramps, each of said ramps defining a lower end portion and an upper end portion, a pivotal rod rotatably mounted to said chassis beneath said ramps lower end portion, said pivotal rod defining opposite end portions each carrying a cam member rotatably mounted thereto; a pair of rim members fixedly mounted to each said ramp upper end portion, said linkage assembly having a main frame, said coupling system comprising a pair of anchoring arms upwardly projecting from said linkage assembly main frame, each of said anchoring arms having a main leg, a downwardly inclined first end portion and an upwardly inclined second end portion opposite the first end portion thereof on opposite ends of said main leg, each anchoring arm first and second end portions defining rearwardly facing first and second notches respectively, a stopper member being carried transversely outwardly of an intermediate section of each said anchoring arm main leg, each said anchoring arm main leg complementary in shape to a corresponding one of said ramps wherein each said first notch is releasably transversely engaged with a corresponding end portion of said pivotal rod and each said second notch is releasably transversely engaged with a corresponding said rim member whereby said cam members come in transverse register with a corresponding said stopper member; and each said cam member of such size and shape as to have a first unlocked condition, clearing the corresponding said stopper member and allowing disengagement of said linkage assembly from said tractor, and a rotated second locked condition upon rotation of said pivotal rod and in wedged locking engagement with said corresponding stopper member that brings about interlock of said linkage assembly with said tractor.

9. A vehicle as in claim 8, further including a cam member release preventing device, that prevents accidental release of each said cam member from its second said locked condition with corresponding said stopper member.

10. A vehicle as in claim 9, further including a hydraulic ram, defining a cylinder fixedly mounted to said tractor chassis adjacent said rim members, and a piston rod, pivotally connected to said pivotal rod via a pivotal bracket, said ram controlling rotation of said pivotal rod and associated cam members.

11. A vehicle as in claim 10, wherein said cam member release preventing device consists of a pair of support blocks, each one carried beneath a lower portion of each of said ramps closely spaced from corresponding said cam members, a pair of sliding stops each movably mounted over each corresponding said support block, each said sliding stop including a rearwardly projecting ear, a pair of over-center compression spring mounted connecting rod members each pivotally mounted at a bottom end to a corresponding said ear and tiltable between a first limit position generally forming a V-shape with said sliding stop and corresponding to said cam member second locked condition, and a second limit position generally parallel to said sliding stop and corresponding to said cam member first unlocked condition thereof, a transverse link joining both said connecting rod members, a hand lever transversely carried at an intermediate section thereof by said transverse link and pivotally connected at a lower end to one connecting rod member; and a push link pivotally mounted at one end to said pivotal bracket and at its opposite end to a pivot pin transversely engaging an elongated ovoidal slot made along a rear length section of said push link; wherein pull action of a free upper end portion of said hand lever from V-shape said first limit position relative to said sliding stop to said second parallel limit position relative to said sliding stop enabling moving of said cam members to a release position by angularly tilting said connecting rod members and associated sliding stops away from said cam members.

12. A vehicle as in claim 11, wherein each said stopper member is of generally triangular shape.

13. A vehicle as in claim 11, further including a pair of shoulder bolts each fitted between said transverse link and a corresponding one of said connector rods.

14. A vehicle as in claim 11, further including a wear bushing mounted around said pivotal rod between said pivot bracket and the corresponding said cam member.

\* \* \* \* \*